United States Patent
Subramaniam et al.

(10) Patent No.: US 9,350,175 B2
(45) Date of Patent: May 24, 2016

(54) INPUT RELAY ARCHITECTURE FOR RECTIFYING POWER CONVERTERS AND SUITABLE FOR AC OR DC SOURCE POWER

(71) Applicant: General Electric Company, Schenectady, NY (US)

(72) Inventors: Palanivel Subramaniam, Richardson, TX (US); Raghothama Reddy, Murphy, TX (US); Gary Lin, Rowlett, TX (US)

(73) Assignee: General Electric Company, Schenectady, NY (US)

( * ) Notice: Subject to any disclaimer, the term of this patent is extended or adjusted under 35 U.S.C. 154(b) by 290 days.

(21) Appl. No.: 13/785,334

(22) Filed: Mar. 5, 2013

(65) Prior Publication Data

US 2013/0308356 A1    Nov. 21, 2013

Related U.S. Application Data

(60) Provisional application No. 61/625,186, filed on Apr. 17, 2012.

(51) Int. Cl.
| | |
|---|---|
| *H02H 7/125* | (2006.01) |
| *H02J 5/00* | (2016.01) |
| *H02J 3/38* | (2006.01) |
| *H02J 7/34* | (2006.01) |
| *H02M 3/04* | (2006.01) |
| *H02M 3/24* | (2006.01) |
| *H02M 7/12* | (2006.01) |
| *H02M 1/42* | (2007.01) |

(52) U.S. Cl.
CPC ... *H02J 5/00* (2013.01); *H02J 3/38* (2013.01); *H02J 3/382* (2013.01); *H02J 7/34* (2013.01); *H02M 1/4225* (2013.01); *H02M 1/4258* (2013.01); *H02M 3/04* (2013.01); *H02M 3/24* (2013.01); *H02M 7/125* (2013.01); *Y02B 10/14* (2013.01); *Y02B 70/126* (2013.01); *Y10T 307/625* (2015.04); *Y10T 307/658* (2015.04)

(58) Field of Classification Search
CPC ........... H02M 1/32; H02M 1/34; H02M 1/36; H02M 1/4208; H02M 3/157; H02M 3/1584; H02M 3/33592; H02M 7/06; H02M 7/062; H02M 7/10; H02M 7/219; H02M 7/125; H02M 3/04; H02M 3/24; H02M 1/4225; H02M 1/4258
USPC .......... 363/50, 52, 53, 125–127, 54, 124, 128
See application file for complete search history.

(56) References Cited

U.S. PATENT DOCUMENTS

| | | | |
|---|---|---|---|
| 4,015,171 A | * | 3/1977 | Miller .................... H02H 3/087 361/114 |
| 5,124,905 A | | 6/1992 | Kniepkamp |

(Continued)

*Primary Examiner* — Gary L Laxton
*Assistant Examiner* — Kevin H Sprenger
(74) *Attorney, Agent, or Firm* — General Electric Company

(57) ABSTRACT

Power converter circuitry for converting power from a power source of any one of a number of power source types, and in which arcing at relays in the event of a shutdown is avoided. A shunt circuit is provided in inrush and protection circuitry of the power converter, the circuit including a power field-effect transistor and optionally a series-connected relay. The shunt circuit is controlled to divert current from the main relay in the event of a rectifier fault, allowing the main relay to be opened under reduced or zero current. The field-effect transistor of the shunt circuit can then be safely opened, allowing its series relay to be opened under zero current conditions.

20 Claims, 11 Drawing Sheets

(56) References Cited

U.S. PATENT DOCUMENTS

| | | | |
|---|---|---|---|
| 7,042,161 B1 | 5/2006 | Konopka | |
| 7,049,546 B2 * | 5/2006 | Thommes | 219/130.21 |
| 7,158,393 B2 * | 1/2007 | Schneider | 363/34 |
| 7,279,850 B2 | 10/2007 | Boys et al. | |
| 7,288,901 B1 | 10/2007 | Yu et al. | |
| 7,312,588 B1 | 12/2007 | Yu et al. | |
| 7,750,499 B2 * | 7/2010 | Jeong | 307/31 |
| 8,829,717 B2 * | 9/2014 | Kudo et al. | 307/77 |
| 2002/0080630 A1 * | 6/2002 | Hodge, Jr. | 363/50 |
| 2004/0160128 A1 * | 8/2004 | Athari | H02M 1/4225 307/44 |
| 2008/0049458 A1 * | 2/2008 | Pozzuoli et al. | 363/21.12 |
| 2011/0069516 A1 * | 3/2011 | Greene et al. | 363/126 |
| 2012/0280665 A1 * | 11/2012 | Su et al. | 322/89 |
| 2013/0128639 A1 * | 5/2013 | Ettes et al. | 363/126 |

* cited by examiner

INPUT RELAY ARCHITECTURE FOR RECTIFYING POWER CONVERTERS AND SUITABLE FOR AC OR DC SOURCE POWER

CROSS-REFERENCE TO RELATED APPLICATIONS

This application claims priority, under 35 U.S.C. §119(e), to Provisional Application No. 61/625,186, filed Apr. 17, 2012, which is incorporated herein by this reference.

BACKGROUND

This disclosure is in the field of electric power distribution. Disclosed embodiments are directed to rectifiers, rectifying power converters, and systems including such devices, capable of receiving power from various types of power sources.

The generation of electrical power from renewable energy sources such as solar, wind, water, and geothermal has become more popular in recent years. Solar and wind energy have become especially attractive in providing electrical power to loads near the generation site, such as at cellular telephone towers, telecommunication central offices, home or business locations that are independent from the electrical power grid, and the like. The electrical power generated by solar and wind-generated electrical power fluctuates over time (e.g., day vs. night for solar power), and in response to weather and other environmental conditions.

To reduce the expense of metered power from the AC grid and to reduce environmental impact, among other reasons, it is often desirable to use power from renewable sources such as solar cell arrays, wind-powered generators, and the like when that power is available. For example, this preference is useful at remote or otherwise self-contained installations of both a renewable power source and the load powered by that power source, such as at cell towers. However, the power generated by different types of power sources differs greatly in frequency behavior and in output impedance, especially in the case of renewable sources. These differences render it difficult to arrive at a power converter architecture that can optimally and efficiently convert power from this wide array of input power sources.

Regardless of the power source, it is important for protection circuitry to be provided near the input of the power converter, to protect the power converter circuitry from over-current events, and to ensure that faults within the power converter do not damage the power source. This protection circuitry commonly includes one or more relays, in combination with current limiting devices to reduce the "inrush" current at start up. But the differing attributes of the power generated by different power source types benefit from dedicated protection and inrush circuitry in power converters according to input power source type, or necessitate use of the most conservative components (e.g., "DC-rated" relays) to construct a power converter suitable for multiple types of power sources.

BRIEF SUMMARY OF THE EMBODIMENTS

Disclosed embodiments provide a power converter, and method of operating the same, capable of isolating the power converter from an input source in case of a fault, and in which current is diverted from relays prior to opening the relay contacts.

Disclosed embodiments provide such a power converter and method of an architecture suitable for converting power from either "hard" or "soft" DC power sources, or from an AC power source such as the electrical power grid or a fossil-fueled generator.

Disclosed embodiments provide such a power converter and method capable of recognizing the type of power source at its input, and of selectively enabling and disabling input protection circuitry accordingly.

Disclosed embodiments provide such a power converter and method capable of converting DC input power, but which facilitates the use of smaller size and capacity protection circuit relays (e.g., "AC-rated" relays).

A power converter circuit that receives AC or DC power from a power source, and that converts that power into DC power applied to a load, includes input protection circuitry with at least one series-connected relay between the power converter input and rectifying circuitry. The power converter circuit also includes a shunt circuit, including at least a field-effect transistor, controlled to remain open during normal operation. In the event of a fault, the shunt circuit closes to divert current from the series-connected relay, after which that relay can be opened safely. The shunt circuit may be implemented across the power inputs ahead of the protected relay, or may be connected in parallel with that relay. The shunt circuit may also include an auxiliary relay in series with the transistor. Power type detection circuitry may be provided to detect the type of input power received, and enable shunt circuit operation only for certain types of input power sources.

DETAILED DESCRIPTION OF THE EMBODIMENTS

Figure 1:
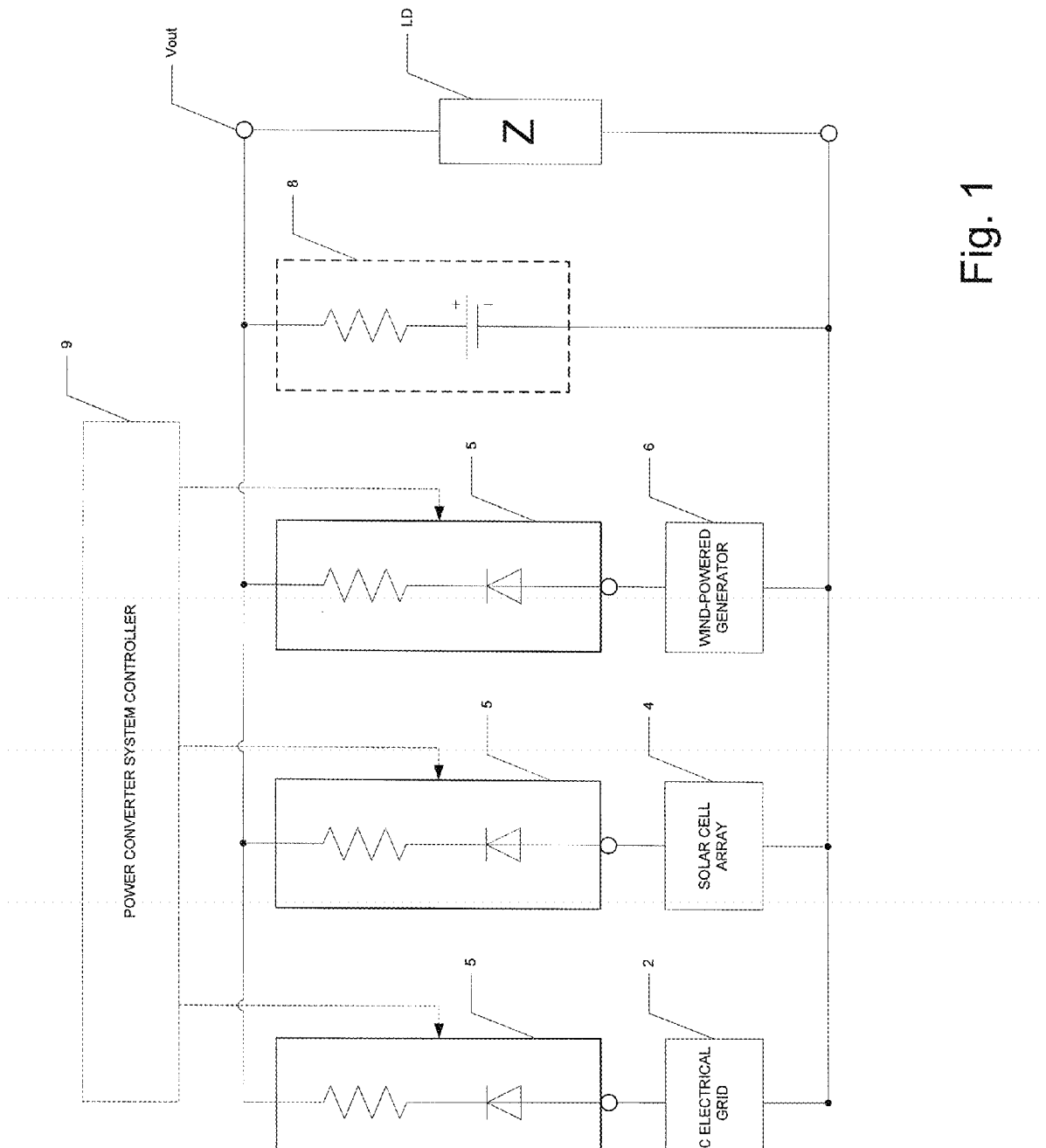
FIG. 1 is an electrical diagram, in block and schematic form, of a power converter system constructed according to embodiments of the disclosure.

FIG. 1 illustrates a power converter system constructed according to the embodiments disclosed in this specification. This system includes multiple power converters 5, each of which converts power received from one of multiple available power sources 2, 4, 6, and applies that converted power to load LD at output power bus Vout. While a single power converter 5 is shown in FIG. 1 as associated with each power source 2, 4, 6, it is contemplated that multiple power converters 5 may be connected in parallel to simultaneously convert power from any or all of power sources 2, 4, 6. Load LD may correspond to any facility that consumes electrical power, for example transceivers, antennae, and other electronic functions at a cellular telephone tower system; motors, lighting, switching gear, and other loads installed at a home or commercial facility; loads at smaller-scale systems such as intersection traffic signals; and the like.

In the system of FIG. 1, the available power sources include the AC electrical grid 2, solar cell array 4, wind-powered generator (i.e., windmill) 6, and battery backup system 8. Other types of power sources may also be used in some embodiments, including diesel generators, geothermal electrical generators, water-powered generators, fuel cells, and the like. Of course, more or fewer power sources may be included within any particular power converter system installation. Battery backup system 8 is optionally included within this power converter system, to provide emergency power to load LD if all of power sources 2, 4, 6 become unavailable or inadequate at a point in time. If so provided, battery backup system 8 would include charging circuitry for charging the available batteries from output power bus Vout, in effect becoming part of the effective load to power sources 2, 4, 6 and power converters 5. In a co-generation context, load LD may correspond to the AC electrical grid itself, in which case an inverter (not shown) would receive power from output power bus Vout and produce AC power for application to the grid.

Power converter system controller 9 is optionally provided in the system of FIG. 1. As will become apparent from the following description, each power converter 5 may autonomously control its operation without relying on external power system controller 9 to effect such control. Even so, power system controller 9 may still be provided for purposes of overall system monitoring, configuration and adjustment of various parameters (e.g., the target output DC voltage from each power converter 5), and the like.

According to the disclosed embodiments, the power converter system of FIG. 1 is operated to preferentially convert power from one or more of the sources relative to the others, for example to favor drawing power from renewable sources first, using power from the grid or from a diesel generator when necessary (e.g., when power from solar and wind sources is insufficient), and relying on battery backup power only in emergencies. This prioritization minimizes the consumption of metered power and, in the environmentally-sensitive sense, minimizes the consumption of power from fossil-fuel sources. Application of this priority scheme to the system of FIG. 1 would prioritize the use of power from solar cell array 4 and wind-powered generator 6 over power from AC electrical grid 2 and other fossil-fuel powered or metered power sources, such as diesel generators. This prioritization may be accomplished in a similar manner to that described in U.S. Patent Application Publication No. US 2011/0006600, by controlling power converters associated with renewable and other preferred power sources to output a higher DC output voltage than the DC output voltage from power converters associated with less-preferred power sources. For example, the highest priority power source may have its associated power converter operating at the highest DC output voltage (e.g., 48.1 volts) to preferentially draw power from that source. The next highest priority power source may have its power converter controlled to output power at a next highest output voltage (e.g., 48.0 volts), and the lowest priority power source may then its power converter outputting the lowest voltage (e.g., 47.9 volts). In the context of the system of FIG. 1 and according to some embodiments, this prioritized operation may be programmed into power converters 5 themselves, without requiring the supervisory external power system controller 9. Alternatively, the prioritization may be implemented by power system controller 9.

Figure 2:
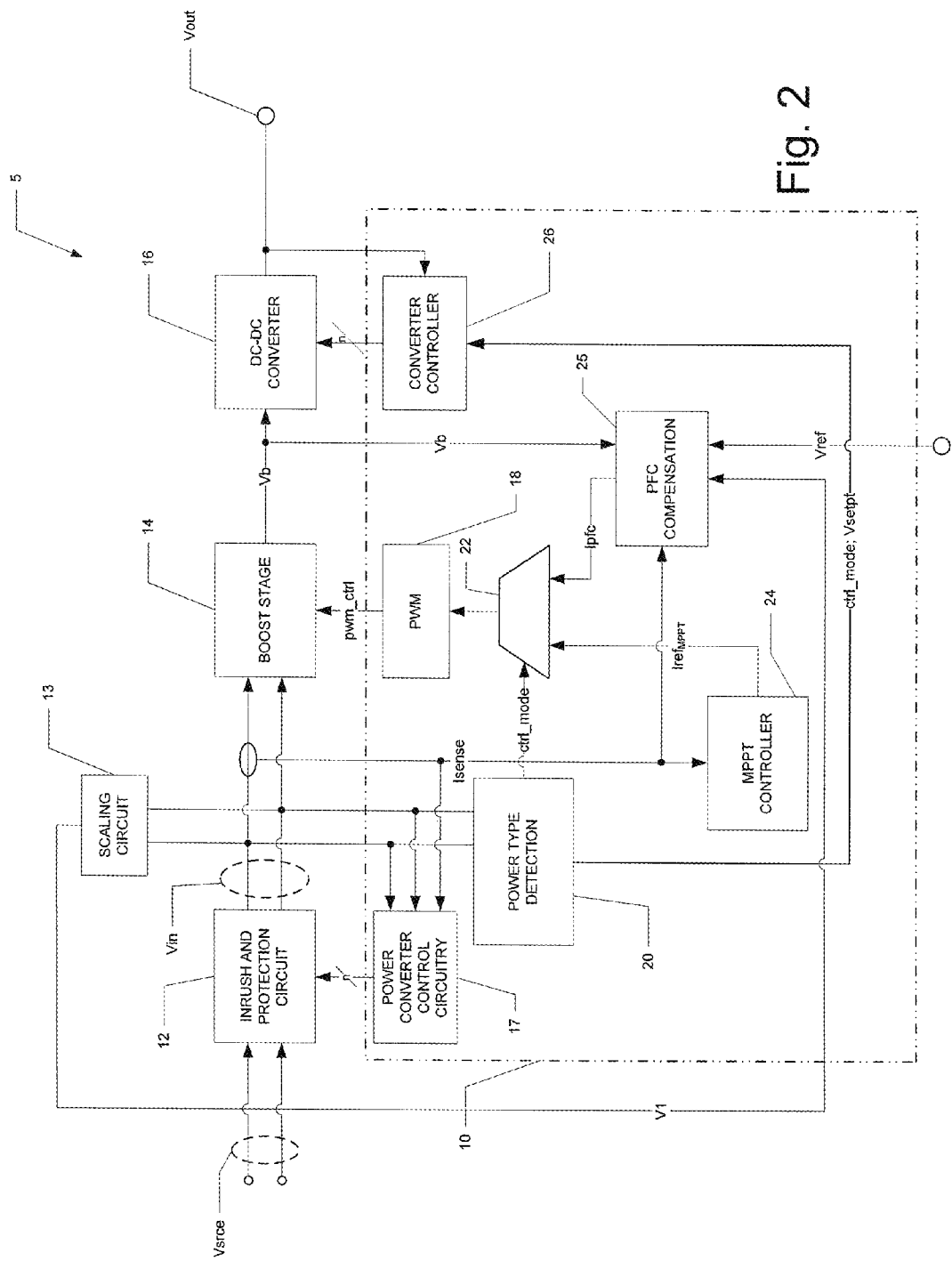
FIG. 2 is an electrical diagram, in block form, of a power converter in the system of FIG. 1, constructed according to embodiments of the disclosure.

Referring now to FIG. 2, the construction of power converter 5 according to the embodiments disclosed in this specification will now be described. In this example, power converter 5 receives power from a corresponding power source 2, 4, 6 across terminals Vsrce. Inrush and protection circuit 12 is connected to terminal Vsrce as shown to suppress and reduce electromagnetic interference (EMI), power surges and inrushes, and the like. The construction of inrush and protection circuit 12 according to various embodiments will be described in further detail below. Depending on the type of input power source connected to terminal Vsrce, the power received across terminals Vsrce may be AC power at a relatively stable frequency (e.g., 50 Hz or 60 Hz) such as received from AC grid 2 or a diesel generator, AC power at a lower and somewhat variable frequency such as generated by wind-powered generator 6, or DC power such as generated by solar cell array 4.

In this embodiment, power converter 5 is a two-stage converter, including a first stage of rectifying stage 14 followed by a secondary stage of isolating DC-DC converter stage 16. Input power Vin, which is in the same general form as the power received across terminals Vsrce, is presented by inrush and protection circuit 12 to rectifying stage 14. As will be described below, rectifying stage 14 is constructed so as to produce a DC voltage at DC bus Vb based on input power Vin, whether AC or DC. In some embodiments, the voltage generated at DC bus Vb is higher than the voltage of the power received at terminal Vsrce, for example on the order of 380 to 400 Vdc.

Figure 3:
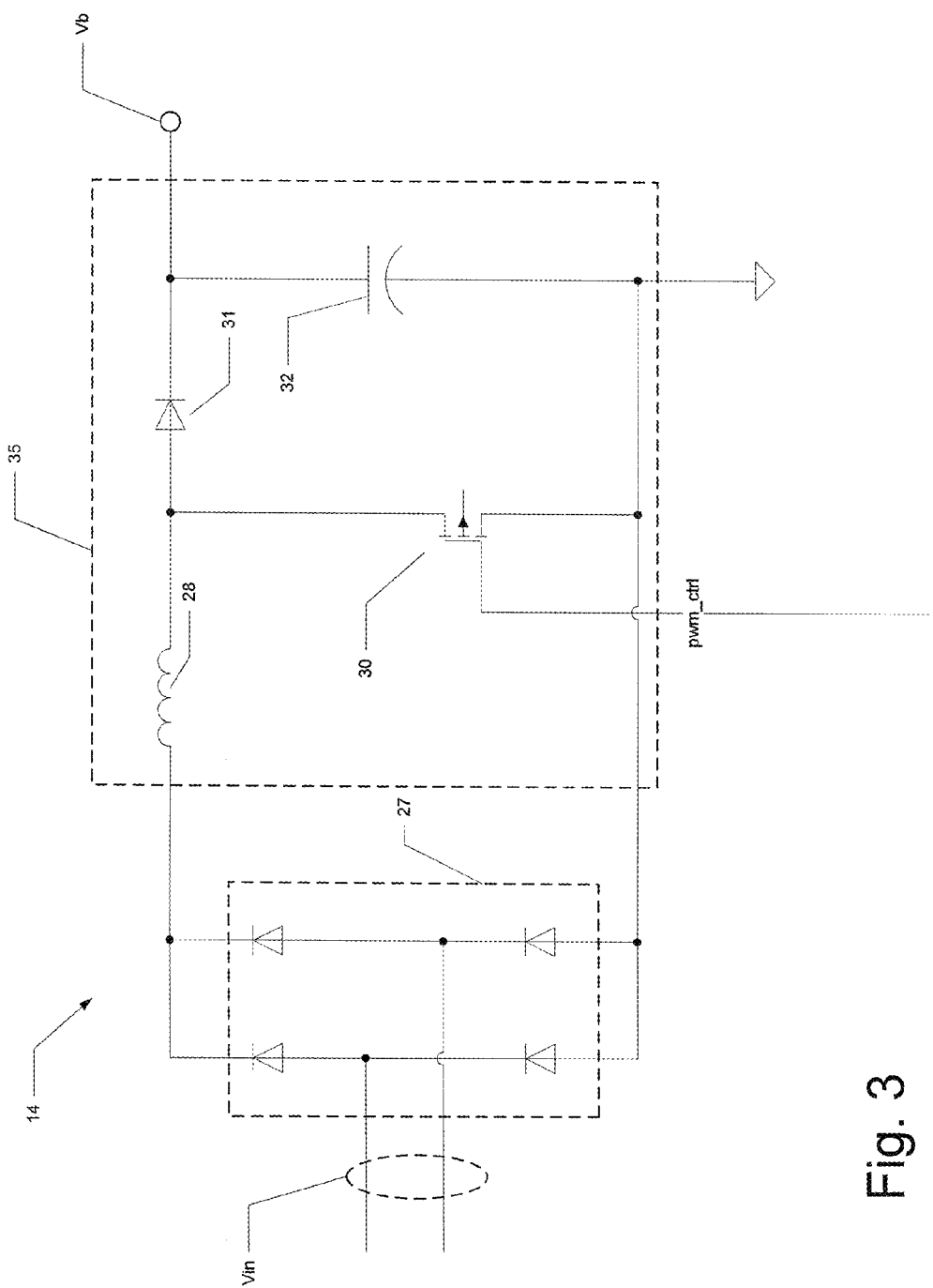
FIG. 3 is an electrical diagram, in schematic form, of a rectifying stage in the power converter of FIG. 2, according to embodiments of the disclosure.

FIG. 3 illustrates an example of the construction of rectifying stage 14, as suitable for use in connection with these disclosed embodiments. While this particular construction of rectifying stage 14 follows the conventional design for rectifying stages of the "boost" type; it is contemplated that rectifying stage 14 may alternatively be constructed according to any one of a number of other design approaches known in the art or as may be subsequently developed for rectifying stages in a multi-stage power converter, or for single-stage rectifiers. In the example of FIG. 3, input terminals Vin are connected to diode bridge 27, which operates as a half-wave rectifier in the conventional manner. Inductor 28 is connected between diode bridge 27 and the anode of flyback diode 31, the cathode of which is at DC bus Vb. The source/drain path of field-effect transistor 30 is connected between the node at which inductor 28 is connected to the anode of flyback diode 31 is also connected to the source/drain path of field-effect transistor 30 and signal ground, at the opposite side of diode bridge 27. Capacitor 32 is connected between DC bus Vb and the ground terminal. Inductor 28, transistor 30, diode 31, and capacitor 32 collectively constitute power factor compensation circuit 35. Control line pwm_ctrl is connected to the gate of transistor 30, and as such controls the delivery of energy to DC bus Vb in the conventional manner. To summarize, energy is delivered via diode bridge 27 to inductor 28 while transistor 30 is turned on by line pwm_ctrl; while transistor 30 is off, the energy stored in inductor 28 is delivered through flyback diode to capacitor 32, and thus to DC bus Vb. The voltage at DC bus Vb varies with the duty cycle of the control signal on line pwm_ctrl, as generated by pulse width modulator 18 in power converter 5 of FIG. 2.

Pulse width modulator 18 produces pulses on line pwm_ctrl in response to a control function within power converter 5, such that the voltage output by rectifying stage 14 at DC bus VB is controlled in the desired manner. Various control techniques can be used in power converter 5 to control pulse width modulator 18. One such technique is referred to in the art as power factor compensation (PFC), in which the duty cycle at the output of pulse width modulator 18, on line pwm_ctrl, corresponds to an error voltage between a reference voltage and the voltage at DC bus Vb at the output of rectifying stage 14, scaled by the input voltage. By controlling the duty cycle of pulse width modulator 14 with a signal generated in this manner, rectifying stage 14 may be controlled to operate at a near-unity power factor, minimizing losses in the rectification of AC input power. PFC control is well-suited for control of rectifying stage 14 in the conversion of AC input power from the AC grid, or as generated by a diesel or other fossil-fueled generator.

Another technique used to control pulse width modulator 18 is referred to in the art as maximum power point tracking ("MPPT"), which is a technique for maximizing the power harvested from power sources that exhibit current-voltage characteristics in which output current falls off as output voltage increases beyond a certain limit. Renewable power sources, such as solar cell array 2 and wind-powered generator 6 exhibit this behavior. MPPT control adjusts the effective input impedance of the power converter so that the source operates at the "knee" of its current-voltage characteristic (i.e., at the highest output voltage before output current drops off appreciably), which is the maximum power operating point, and maintains this optimized power output by tracking changes in this maximum power operating point that may occur over time, for example in response to changes at the power source. Various techniques for performing MMPT tracking and adjustment are known in the art. As mentioned above, MPPT control is well-suited for controlling rectifying stage 14 in the conversion of input power from renewable power sources such as solar cell array 4, wind-powered generator 6, and the like, each of which exhibit variations in output current with varying output voltage.

In the example of power converter 5 shown in FIG. 2, pulse width modulator 18 produces pulses on line pwm_ctrl to rectifying stage 14 in response to one of at least two control circuits, as selected by select circuit 22 and forwarded to pulse width modulator 18. In this embodiment, select circuit 22 has one input receiving control signal Iref$_{MPPT}$ from maximum power point tracking (MPPT) controller 24, and another input receiving control signal Iref$_{PFC}$ from power factor compensation (PFC) circuit 25. Select circuit 22 has a select input receiving select signal ctrl_mode from power type detection circuit 20, which controls which of those two inputs will be forwarded to pulse width modulator 18. In this embodiment, when select circuit 22 enables control of pulse width modulator 18 by MPPT controller 24, rectifying stage 14 is controlled to maximize the energy harvested from the input power sources (e.g., renewable power sources). When select circuit 22 enables control of pulse width modulator 18 by PFC compensation circuit 25, rectifying stage 14 is controlled to operate at a near-unity power factor in converting power from the AC grid or diesel generators. In other words, according to these disclosed embodiments, the operation of rectifying stage 14 is controlled in a manner that depends upon the nature of the power received at terminal Vsrce, and thus according to the type of power source delivering that energy.

In the two-stage example of power converter 5 shown in FIG. 2, DC-DC converter stage 16 converts the DC bus voltage Vb from rectifying stage 14 into the eventual output DC voltage presented at terminal Vout, which is connected to output bus VDCout (FIG. 1). DC-DC converter stage 16 galvanically isolates output terminal Vout from DC bus Vb within power converter 5, and thus from the power source 2, 4, 6 associated with power converter 5, to prevent propagation of faults as known in the art. DC-DC converter stage 16 may be of conventional construction in this embodiment, for example as an LLC resonant DC-DC converter including an inverting substage followed by a rectifying substage. Converter controller 26 is provided with power converter 5, to control the operation of DC-DC converter stage 16. In some embodiments, converter controller 26 controls DC-DC converter stage 16 to use feedback control to regulate the output voltage appearing at terminal Vout for some power sources, for example by responding to an error voltage between the voltage at output bus Vout and a setpoint voltage. In other embodiments, converter controller 26 may control DC-DC converter stage 16 to operate in an "open loop" fashion, for example at its resonant frequency. This open loop control is suitable for use with rectifying stage 14 under MPPT control, in which case the voltage at DC bus Vb will effectively control the voltage at output bus Vout. According to the embodiment of FIG. 2, the manner in which converter controller 26 operates depends upon the nature of the power received at terminal Vsrce, and thus depends upon the type of power source delivering that energy, as detected by power type detection circuit 20 and communicated to DC-DC converter stage 16 by way of control signals. For example, converter controller 26 may control DC-DC converter stage 16 using feedback control to regulate the output voltage appearing at terminal Vout for some power sources (e.g., the AC grid and diesel generators), but allow DC-DC converter stage 16 to operate in an "open loop" fashion for power from other power sources (e.g., renewable power sources).

Additional control logic instances may also be implemented within power converter 5. For example, and as will be described in further detail below, the control of various circuit features, including relays and the like, during the normal operation of power converter 5 may be carried out by power converter control circuitry 17, as shown in FIG. 2. According to these embodiments, power converter control circuitry 17 also carries out fault detection, for example by sensing voltage Vin and current Isense as shown in FIG. 2; other voltages and currents may also be monitored by power converter control circuitry 17 in carrying out this fault detection or other control functions. Further, there are logic circuitry programs or implementing power converter control circuitry 17.

The power converter 5 of FIG. 2 may be implemented in any one of a number of physical implementations. In particular, it is contemplated that and particularly the control circuitry including any or all of power converter control circuitry 17, power type detection circuit 20, MPPT controller 24, PFC compensation circuit 25, converter controller 26, pulse width modulator 18, and select circuit 22, may be realized in the digital domain, for example by single chip digital signal processor (DSP) 10 as indicated in FIG. 2. If implemented in that manner, DSP 10 would include the necessary programmable logic circuitry for executing corresponding program instructions to carry out the functions corresponding to those circuits as described in this specification; program memory storing those program instructions to be executed may reside within DSP 10 itself, or may be stored in a memory resource (not shown) external to DSP 10. Other functions within power converter 5, including rectifying stage 14 and isolating DC-DC converter stage 16 will typically be realized by discrete components, especially considering the high power levels that are the subject of the power conversion, and the inductors and transformers implemented in those stages.

Figure 4A:
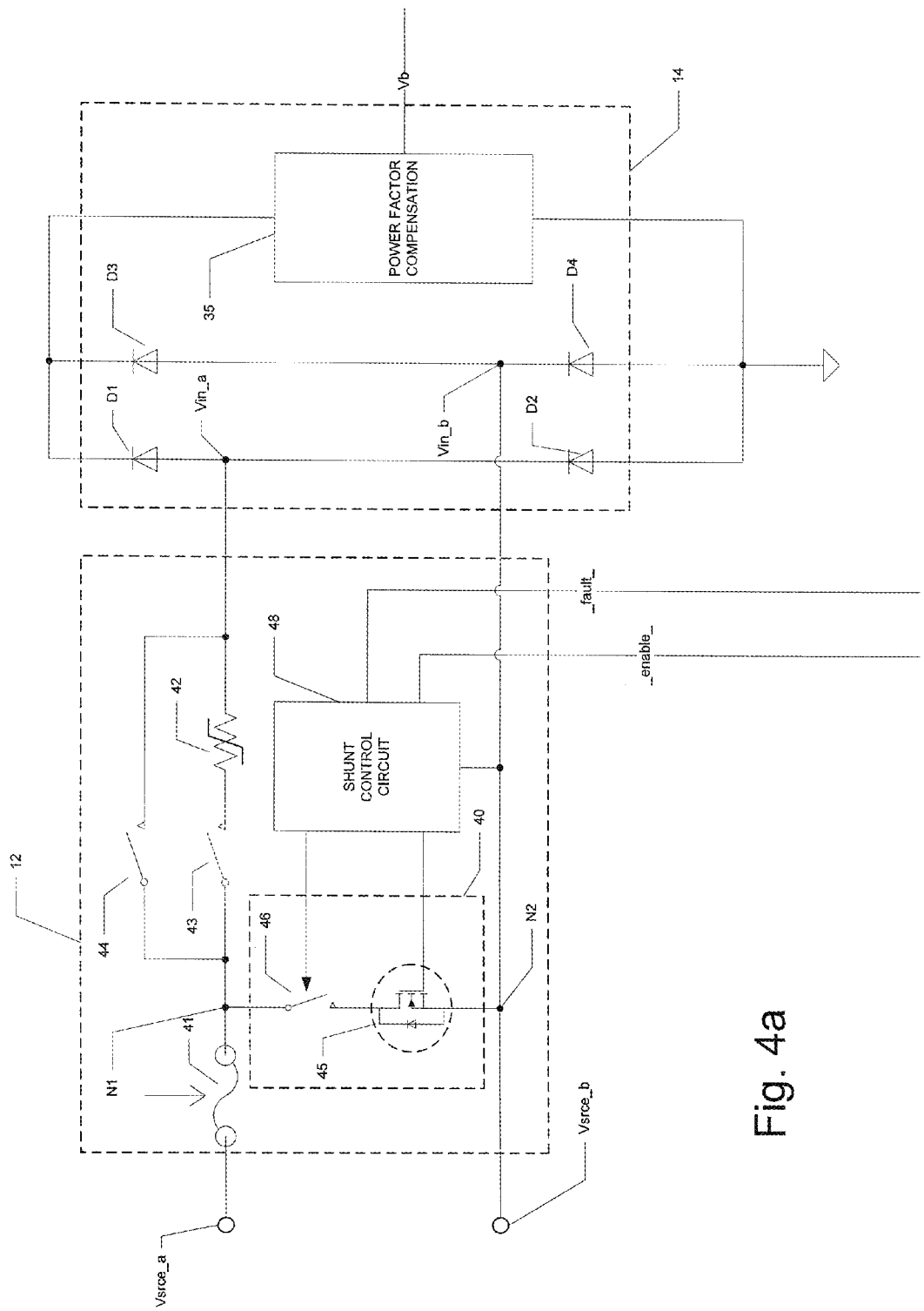
FIG. 4a is an electrical diagram, in schematic form, of inrush and protection circuitry in combination with a rectifying stage according to an embodiment.

FIG. 4a illustrates the construction of inrush and protection circuit 12 according to an embodiment, in combination with rectifying stage 14. In this example, terminals Vsrce_a, Vsrce_b correspond to the input terminals Vsrce of power converter 5, and may receive DC power or AC power. For purposes of this description, Vsrce_a will be considered as the positive input terminal, in the context of a DC input source. Inrush and protection circuit 12 includes fuse 41, which in this example is connected to input terminal Vsrce_a. Fuse 41 serves to protect power converter 5 from damage due to crowbar faults or other overcurrent conditions, primarily in cases in which "hard" DC sources (i.e., DC sources in which current is effectively unlimited, such as from battery backup system 8 and the like) are supplying the input power. In the alternative to fuse 41, a circuit breaker or other interrupter device may be used if desired.

Current limiting device 42 is connected in series with fuse 41 between input terminal Vsrce_a and node Vin_a of rectifying circuit 14. In this example, current limiting device 42 is realized by a positive temperature coefficient (PTC) device such as a resettable fuse, polyfuse, polyswitch, non-linear thermistor, or the like; alternatively, a linear resistor may be used as current limiting device 42. In any case, current limiting device 42 serves to limit the instantaneous current applied during an "inrush" condition, such as at power-up or initial connection of a power source at terminals Vsrce_a, Vsrce_b. If desired, relay 43 may optionally be included, with its contact path (i.e., the conductive path opened and closed by the opening and closing of relay contacts) in series with current limiting device 42. The energizing coil (not shown) of relay 43 is controlled by power converter control circuitry 17 or other circuitry within power converter 5. Relay 44 is also provided in inrush and protection circuit 12, with its contact path connected in parallel with current limiting device 42 (and, if provided, the contact path of relay 43); relay 44 may also be controlled by power converter control circuitry 17 or other circuitry within power converer 5. In this embodiment, the parallel combination of current limiting device 42 and relay 44 is connected in series with fuse 41 between input terminal Vsrce_a and node Vin_a of rectifying stage 14.

According to this embodiment, shunt circuit 40 including field-effect transistor 45 and auxiliary relay 46 is connected between node N1 at which fuse 41 is connected to the parallel combination of current limiting device 43 and relay 44, and node N2, which in this example is connected to input terminal Vsrce_b. Transistor 45 in this embodiment is an n-channel power FET with its source at node N2, its drain connected to the contact path of relay 46, and its gate connected to and controlled by shunt control circuit 48; alternatively, a p-channel field-effect transistor may be used. The contact path of relay 46 is connected between node N1 and the drain of transistor 45 in this example, with its energizing coil (not shown) connected to and controlled by shunt control circuit 48.

It is contemplated that auxiliary relay 46 may be omitted from shunt circuit 40 according to this embodiment, if transistor 45 has a sufficiently high power rating.

Shunt control circuit 48 receives control signals _enable_ and _fault_ from other control circuitry (not shown) in power converter 5. As will be described in further detail below, control signal _enable_ may be based on the type of input power applied to power converter 5, for example as detected by power type detection circuit 20. Control signal _fault_ may be generated by such other control circuitry in response to detecting a fault condition in rectifying stage 14, DC-DC converter stage 16, or elsewhere in power converter 5. Examples of faults that can invoke control signal _fault_ include failure of one of diodes D1 through D4 of rectifying stage 14, a short circuit failure of capacitor 32 or another device in power factor compensation circuit 35, and the like. It is contemplated that control signal _fault_ will be asserted in response to the detection of a circuit failure that is or potentially can result in an overcurrent condition, necessitating shutdown of power converter 5.

Figure 4B:
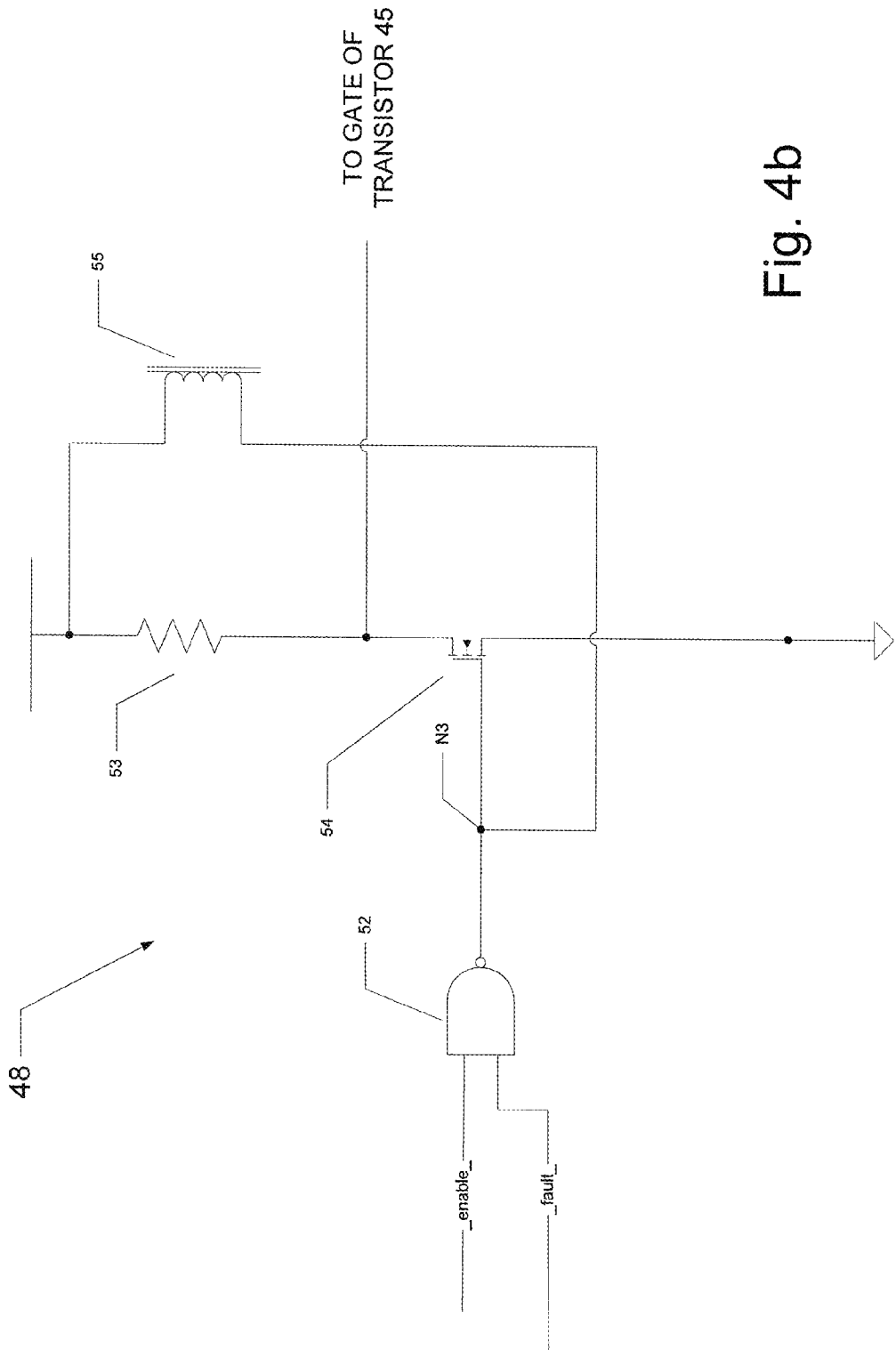
FIG. 4b is an electrical diagram, in schematic form, of power compensation circuitry in the rectifying stage in the power converter of FIG. 2, according to embodiments of the disclosure.

FIG. 4b illustrates a simplified example of the construction of shunt control circuit 48, as useful in these embodiments. Shunt control logic 52 receives control signals _enable_ and _fault_, and includes the appropriate combinational or sequential logic to generate an output signal at node N3, which is connected to the gate of transistor 54 in response. Transistor 54 is, in this example, an n-channel FET with its drain connected to a power supply voltage via resistor 53, and its source at ground. Relay coil 55 for auxiliary relay 46 is connected between the power supply voltage and the output of shunt control logic 52 at node N3. In this simplified example, shunt control logic 52 includes a NAND function receiving control signals _enable_ and _fault_ at its inputs, and driving node N3 at its output. For the case in which relay 46 is open when its coil is not energized ("normally open") and closes ("makes") when its coil is energized, node N3 is driven low only if both of control signals _enable_ and _fault_ are "true" (i.e., at a high logic level); this corresponds to the condition in which shunt circuit 40 is enabled and a fault has been detected. In this situation with node N3 at a low logic level, coil 55 is energized and transistor 54 is turned off, such that the gate of transistor 45 is pulled high via pull-up resistor 53, which turns on transistor 45. If either shunt circuit 40 is not enabled, or if it is enabled and no fault is detected, node N3 will be driven high by shunt control logic 52, maintaining relay 46 open because coil 55 is not energized and turning transistor 54 on, which pulls the gate of transistor 45 low, turning it off. It is of course contemplated that shunt control logic 52, as well as shunt control circuit 48, may include additional logic and control functionality as desired for more complex operation of inrush and protection circuit 12, for example as described below in connection with alternative embodiments and implementations.

As discussed above relative to FIG. 2, power converter 5 according to this embodiment includes power type detection circuit 20. Power type detection circuit 20 detects the type of input power source supplying power to power converter 5, and enables or disables shunt circuit 40 in inrush and protection circuit 12 accordingly, in this embodiment. In addition, as mentioned above, the manner in which rectifying stage 14 and DC-DC converter stage 16 is controlled is also determined in response to the determination made by power type detection circuit 20.

According to this embodiment, power type detection circuit 20 determines the type of power source at its input from the behavior of the received source power. Conventional solar cell arrays 4 typically generate DC power, with the power output depending on the intensity of the solar energy being converted. Wind-powered generators 6 typically generate AC power, but at a relatively low frequency that varies with wind velocity. Power from the AC electrical grid, or from diesel generators, is typically at a relatively constant frequency, for example 50 Hz or 60 Hz. Power supplied from battery backup system 8 is DC power, but is "hard" or "stiff" DC power in the sense that its output current does not vary significantly with variations in its output voltage. Other power sources may supply power that have a signature similar to these, or may have a different behavior from these types. According to these embodiments, power type detection circuit 20 is constructed and operates to identify various power source types from these attributes, as will now be described with reference to FIGS. 5a through 5c.

Figure 5A:
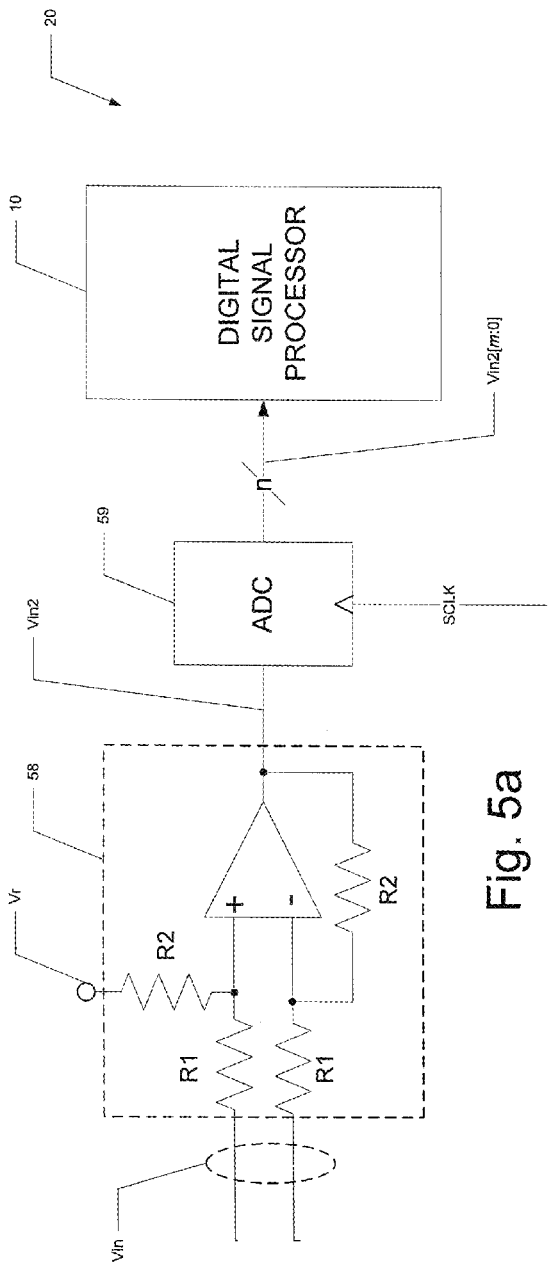
FIG. 5a is an electrical diagram, in block and schematic form, of an AC/DC detection circuit in the power converter of FIG. 2, according to embodiments of the disclosure.
Figure 5B:
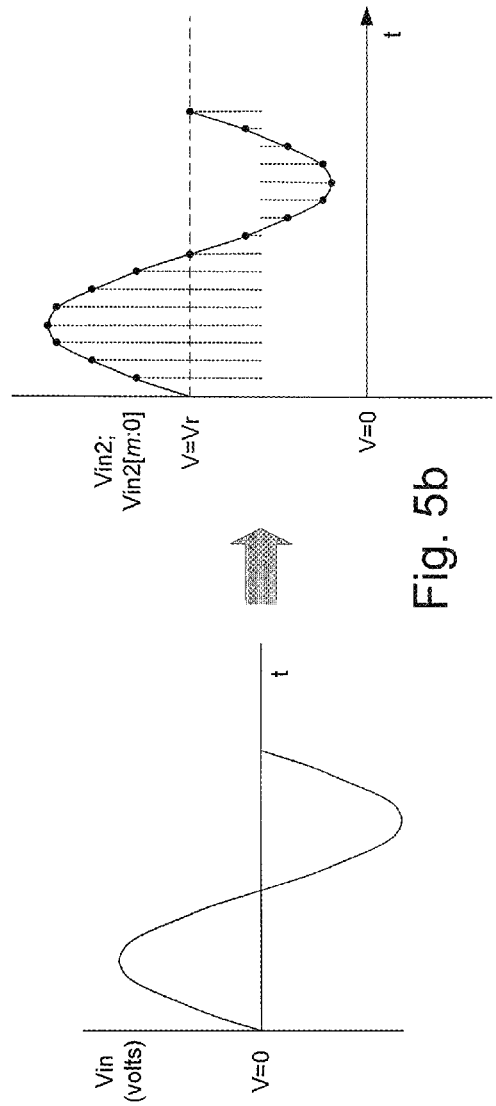
FIG. 5b is a waveform diagram illustrating the operation of the power type detection circuit of FIG. 5a, according to embodiments of the disclosure.

FIG. 5a illustrates the construction of power type detection circuit 20 according to an embodiment. Power type detection circuit 20 includes conventional differential amplifier circuit 58 having an (non-inverting) input coupled to the tap of a voltage divider between a reference voltage Vr and one of the input voltage Vin lines, and another (inverting) input connected to a tap of a voltage divider between the other input voltage line and the output of the operational amplifier itself. As shown in FIG. 5b, voltage Vin2 at the output of differential amplifier 58 follows the voltage of conditioned input voltage Vin, but with its DC level shifted by reference voltage Vr. Analog to digital converter (ADC) 59 samples voltage Vin2 at the output of differential amplifier at the sampling frequency of sampling clock SCLK, and presents digital words Vin2[$m$:0] representative of those samples to DSP 10. In this embodiment, DSP 10 is programmed to analyze the sample stream from ADC 59 to determine the nature of the power received by power converter 5 at its input, based on the behavior of the samples Vin2[$m$:0].

Figure 5C:
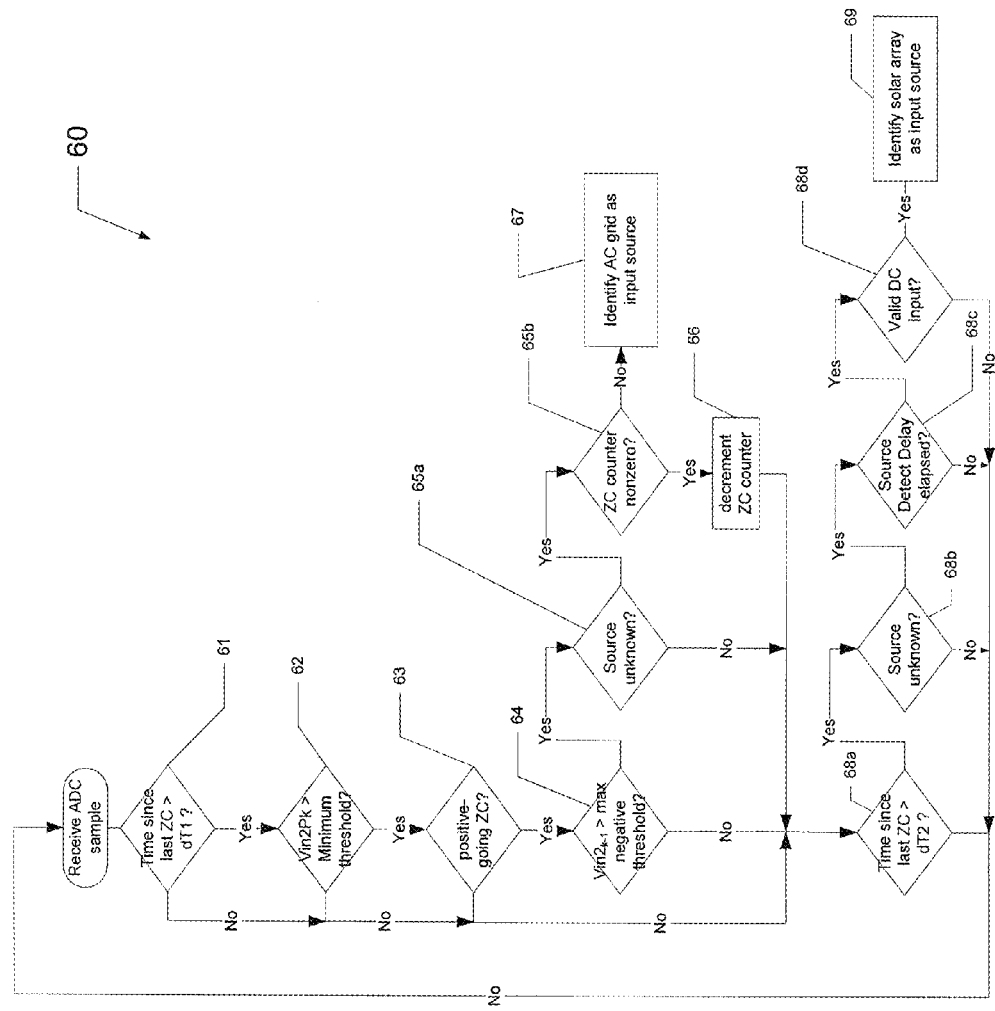
FIG. 5c is a flow diagram illustrating the operation of the power type detection circuit of FIG. 5a, according to embodiments of the disclosure.

FIG. 5c illustrates an example of power source identification process 60 as carried out by power type detection circuit 20 to identify the type of power source as either AC grid 2 or solar cell array 4 based on attributes of the received input power, according to an embodiment. In addition, other embodiments extend the process of FIG. 4c to also identify wind-powered generator 6 as a power source. The example shown in FIG. 5c corresponds to the construction of power type detection circuit 20 described above relative to FIGS. 4a and 4b, in which ADC 59 produces a sample stream of samples Vin2[$m$:0] based on the input voltage received by power converter 5. Process 60 as shown in FIG. 5c thus begins with the receipt by DSP 10 of a sample from ADC 59, and is repeated for each received sample until identification has been attained.

According to this embodiment, power type identification process 60 is based on detection of zero voltage crossings of voltage Vin2. In decision 61, DSP 10 determines, from the received sample stream, whether the time since the last zero crossing of voltage Vin2 (or since power-up of power converter 5, as the case may be) exceeds a first threshold time interval dT1. Threshold time interval dT1 is a preselected duration based on such parameters as the maximum expected frequency of input AC power, the sample rate, truncation error of ADC 59, and other similar factors; decision 61 thus determines whether the most recent zero crossing of voltage Vin2 is sufficiently later than a zero crossing point to accurately analyze. If so (decision 61 is "yes"), DSP 10 executes decision 62 to determine whether the peak voltage Vin2Pk of voltage samples Vin2[$m$:0] since the last zero crossing exceeds a minimum threshold, to ensure sufficient input voltage for analysis. If so (decision 62 is "yes"), decision 63 is executed to determine whether the most recent zero crossing is positive-going (i.e., the waveform is in a positive-going half-cycle), by determining whether the current and previous samples are greater than and less than an offset voltage value, respectively. If so (decision 63 is "yes"), decision 64 is executed to determine whether previous sample value Vin2$_{k-1}$[$m$:0] is above a maximum negative threshold level. Decision 64 is intended to ensure that negative voltage spikes do not enter the power type detection analysis. If decision 64 returns a "yes", analysis of whether the sample stream of voltage Vin2 indicates that AC power is being received is then performed, beginning with decision 65a.

In decision 65a, DSP 10 determines whether the input power source is currently considered as "unknown", meaning that power converter 5 has not previously identified the input power source at its input. If so (decision 65a is "yes"), decision 65b is evaluated to determine whether a certain number of zero crossings have occurred. According to this embodiment, identification of AC grid 2 (or a diesel generator producing 50 or 60 Hz AC power) as the input power source is based on a sufficient number of positive-going zero crossings of sampled voltage Vin2, so that the power source identification is not misled by glitches or spikes. In this example, a zero crossing counter (e.g., a register value) is initialized to a non-zero value (e.g., on the order of ten) upon detection of a power source, and decision 65b determines whether the value of this zero crossing counter is non-zero. If so (decision 65b is "yes"), then the desired number of zero crossings have not yet been detected; the input power source will continue to be considered as "unknown", and the zero crossing counter is decremented in process 66. On the other hand, if the desired number of positive-going zero crossings have been detected (decision 65b is "no"), DSP 10 then identifies the input power source as AC grid 2 in process 67. The zero crossing counter may also be initialized to its non-zero starting value in process 67, for use by other logic in power converter 5 that depends on a zero crossing count.

If any of decisions 62, 63, 64 return a "no" result, or if the zero crossing counter is non-zero as determined in decision 65b (and is decremented in process 66, as noted above), analysis process 60 next determines whether the input power source is a source of DC power, for example solar cell array 4 (FIG. 1). According to this embodiment, decision 68a is executed by DSP 10 to determine whether the elapsed time since the last zero crossing exceeds a second threshold time interval dT2. Threshold time interval dT2 is a preselected duration based on such parameters as the maximum expected frequency of input AC power, the sample rate, truncation error of ADC 59, and other similar factors, but is contemplated to be substantially longer than threshold time interval dT1 of decision 61, for example on the order of tens of milliseconds or even as long as a few seconds. If so (decision 68a is "yes"), decision 68b is then executed to determine whether the input power source is "unknown". If so (decision 68b is "yes"), decision 68c determines whether a preselected source detection delay period following restart of power converter 5 has elapsed, to allow for the discharge of capacitors in input conditioning circuit 12 (FIG. 2), etc. before detecting a potential DC input voltage. If so (decision 68c is "yes"), decision 68d is evaluated to determine whether a valid DC input voltage is indicated by samples Vin2[$m$:0]. For example, decision 68d may determine whether voltage Vin2 has been above a minimum threshold voltage level for a selected time duration based on the minimum expected frequency of potential AC power sources (e.g., wind-powered generator 6, AC grid 2), the sampling rate of ADC 59, and other relevant factors. It is contemplated that this duration may be relatively long, for example on the order of seconds. If so (decision 68d is "yes"), DSP 10 then identifies the input power source as solar cell array 4, in process 69. The zero crossing counter may also be initialized to its non-zero starting value in process 69, for use by other logic in power converter 5 as noted above. On the other hand, if any of decisions 68a through 68d return a "no" result, analysis process 60 will be repeated upon receipt of the next voltage sample Vin2[m:0].

Once the input power source type has been identified for power converter 5, it is contemplated that the identification of the power source type may be stored in non-volatile memory within power converter 5, for retention even after power down. The input power source may become identified as "unknown" only upon an event indicating that power converter 5 may be connected to a different power source, for example upon removal of power converter 5 from its installed location (e.g., from its cabinet).

As mentioned above, additional decisions and processes may be executed by DSP 10 in its function as power type detection circuit 20 in order to identify other power sources. One such example is the identification of wind-powered generator 6 as an input source, by detecting AC power at the input of a variable frequency, and at a maximum frequency of wind-generated power well below the minimum expected AC grid frequency. There is a DSP algorithm for distinguishing low and variable frequency AC voltages Vin2 source by wind-powered generator 6 from the more steady 50 or 60 Hz behavior of AC grid 2, into power type identification process 60 of FIG. 4c and variations thereto. For example, DSP 10 may carry out conventional digital signal processing (e.g., digital Fourier transforms, etc.) to determine the frequency behavior of the received samples Vin2[m:0]; if a dominant frequency within the expected frequency range for AC grid or diesel generator power (e.g., 60 Hz±a selected tolerance) is exhibited, the input power source can be identified as the AC grid, while if the frequency behavior exhibits lower and more variable frequencies, the input power source can be identified as wind-generated power. In some embodiments, there are similar additions and variations to the power detection algorithm for detecting other renewable power sources such as geothermal-powered generators, water-powered generators, and the like.

In these embodiments, inrush and protection circuit 12 includes shunt circuit 40 as discussed above. Shunt circuit 40 is desirably enabled if the input power source providing the input power to power converter 5 is a "soft" DC source. Current from a "soft" DC source, such as from typical solar cell arrays 4, may be insufficient to open fuse 41 (e.g., typically rated at 20 to 30 amperes). On the other hand, conventional high voltage DC sources with low source impedance, such as a battery system, over-provisioned AC to DC converters fed from the AC grid, or over-provisioned DC to DC converters fed from a Fuel Cell, such sources commonly used in data centers, may remain in use for "legacy" 48V loads as the industry transitions to high voltage batteries. While these "hard" or "stiff" DC sources are generally sufficient to open fuse 41, those sources may also be capable of damaging shunt circuit 40 if it is closed. If it is possible that power converter 5 may receive a "hard" DC source at its input, according to some embodiments, measurement and analysis of the voltage across shunt circuit 40 (across nodes N1 and N2 of FIG. 4a) can provide an indication of whether the DC source is soft or stiff. In this case, power type detection circuit 20 will be arranged to execute the appropriate algorithm, for example according to program instructions stored in program memory within or external to power converter 5, to analyze sampled voltages and currents over time to distinguish between "soft" and "hard" DC input power sources, and enable or disable shunt circuit 40 via control signal _enable_ in response. Alternatively, power type detection circuit 20 may analyze the source impedance of the power source from samples of the input voltage (and sensed current Isense, if desired), and in response qualify a DC input power source as having low sourcing capability (e.g. less than 20 A) and enable shunt circuit 40, or identify the source as having high sourcing capability and disable shunt circuit 40.

Figure 6:
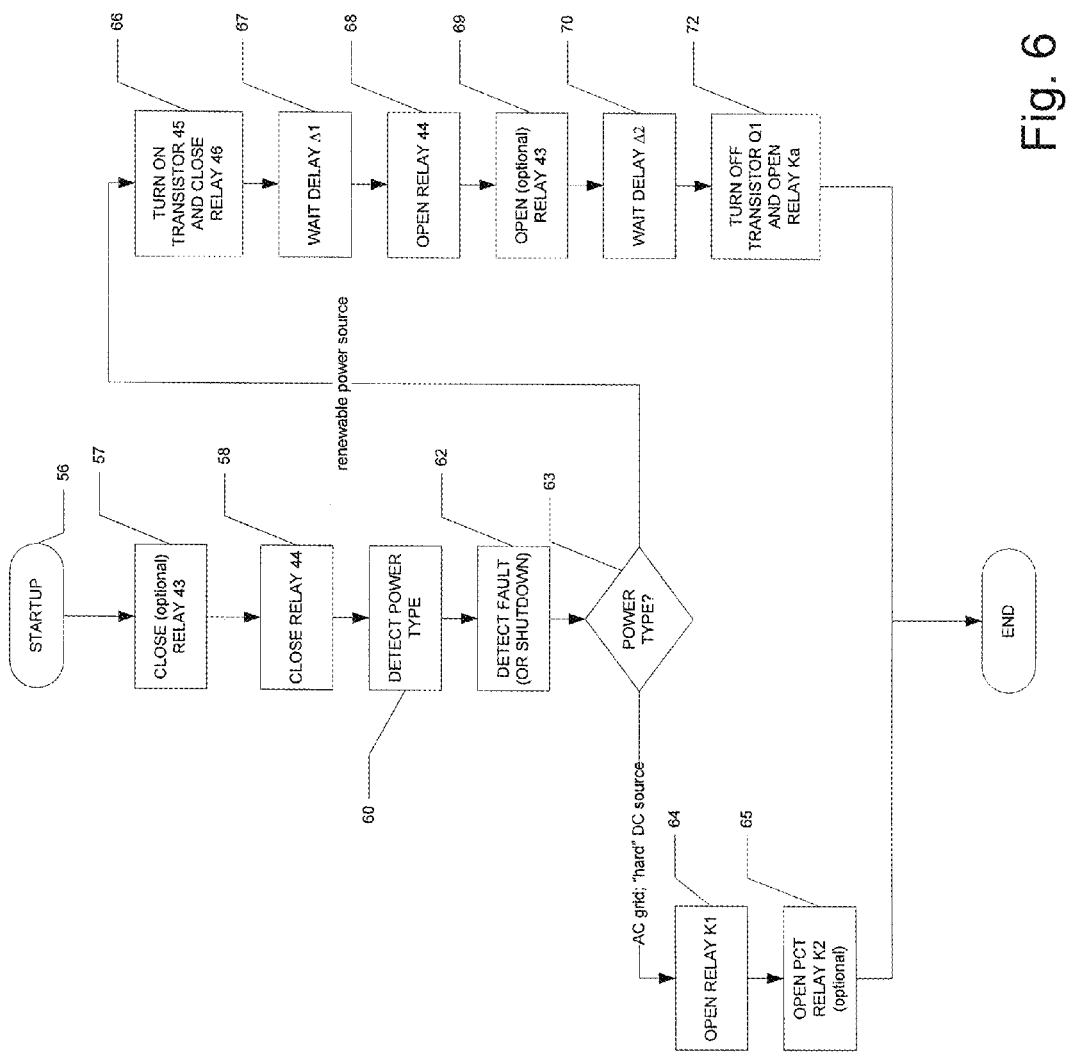
FIG. 6 is a flow diagram illustrating the operation of the inrush and protection circuitry in the power converter of FIG. 2 according to embodiments of the disclosure.

Referring now to FIG. 6, the operation of power converter 5 according to various embodiments will now be described, with reference to inrush and protection circuit 12 described above relative to FIG. 4a. As will be evident from the following description, this operation is also applicable to other embodiments and implementations of inrush and protection circuit 12. This operation begins at startup 56, which corresponds to the energizing or connection of an input power source at inputs Vsrce_a, Vsrce_b of power converter 5. At this point in the operation, if relay 43 in series with current limiting device 42 is included within inrush and protection circuit 12, power converter control circuitry 17 or other circuitry in power converter 5 then closes relay 43 in process 57. Alternatively, if relay 43 is not present, current from the input power source is directly communicated to rectifying stage 14 through current limiting device 42. In either case, current from the input power source is communicated to rectifying stage 14 via current limiting device 42, which limits the transient initial current arriving at rectifying stage 14. After the initial current has been applied to rectifying stage 14 through current limiting device 42 for a sufficient time for inrush transients to have died away, typically on the order of 50 to 100 milliseconds, power converter control circuitry 17 or other circuitry in power converter 5 closes relay 44 in process 58, effectively shorting out current limiting device 42 and directly communicating the input power to rectifying stage 14.

With relay 44 closed, and rectifying stage 14 and DC-DC converter stage 16 of power converter 5 now receiving input power from inputs Vsrce, power type detection circuitry 20 executes process 60. As described above in connection with the example of FIG. 5c, process 60 evaluates attributes of the received input power to detect the type of input power source. In the embodiment of power converter 5 shown in FIG. 2 and described above, the result of power type detection process 60 determines whether shunt circuit 40 in inrush and protection circuit 12 is enabled or disabled, for example by communicating the corresponding logic level of control signal _enable_ to shunt control circuit 48. Optionally, the result of process 60 determines the manner in which rectifying stage 14 and DC-DC converter stage 16 are controlled, as described above.

If no fault or other event occurs following initial startup and during normal operation, power converter 5 converts power received from the input power source and applies that power to load LD. However, upon detection of a fault in process 62, for example as detected by power converter control circuitry 17 or another control function executed by DSP 10 based on sampled voltages and currents within power converter 5, the ensuing actions taken by inrush and protection circuitry 12 will depend on the type of input power source detected in process 60, as evaluated in decision 63.

If decision 63 identifies the input power source as AC grid 2 or a diesel generator outputting AC power of a fixed frequency within an expected frequency range, or a "hard" non-current-limited DC power source as described above, shunt circuit 40 was disabled by the operation of shunt control circuit 48 in process 60, and remains open. The detected fault will, in this case, cause power converter control circuitry 17 to relay 42 in process 64, and then open relay 43 (if present) in process 65. In this case, damage due to arcing at relays 43, 44 is essentially prevented by the nature of the input power. If the input power source is an AC source, any arcing at the newly opened contact gap of relays 43, 44 self-extinguishes at the next zero crossing of the input AC power waveform. In the case of a "hard" DC input source, any arcing upon opening relays 43, 44 is extinguished by the blowing of fuse 41 by the unlimited DC source current.

If decision 63 identifies that input power source as a renewable source, such as solar cell array 4 (outputting "soft" DC power, in that output current is limited and thus varies with output voltage) or wind-powered generator 6 (outputting low and variable frequency AC power), a different sequence of operations is carried out in the event of fault detection in process 62. As discussed above, shunt circuit 40 was enabled by shunt control circuit 48 for these input power types in process 60. In process 66, shunt control circuit 48 turns on transistor 45 and closes relay 46 (if present), effectively shorting node N1 (connected to input Vsrce_a via fuse 41) to node N2 (connected to input Vsrce_b). The manner and sequence in which shunt control circuit 48 closes shunt circuit 40 may vary. For example, since transistor 45 will turn on much faster than the electromechanical device of relay 46 can close, shunt control circuit 48 may simultaneously issue the appropriate signals to both transistor 45 and relay 46, in which case transistor 45 will turn on before relay 46 closes. In this case, because the full input voltage will be across the contacts of relay 46 at the time that it closes, it may be desirable to include an additional current limiting device (not shown) in series with transistor 45 and relay 46 to reduce the initial current as relay 46 closes. Alternatively, shunt control circuit 48 may stagger the timing of process 66 to close relay 46 before turning on transistor 45 is turned on; this approach ensures that relay 46 closes under zero current. Other control sequences are also contemplated.

After the elapse of a delay period Δ1 sufficient to stabilize the current through the newly-closed shunt circuit (process 67), power converter control circuitry 17 opens relay 44 in process 68. Because at this time shunt circuit 40 is closed and diverting the input current from relay 44 and rectifying stage 14, relay 44 is conducting essentially zero current and will have zero voltage across its contacts, and can thus be safely opened without arcing in process 68. If relay 43 is present, it will be under similar zero current conditions after the elapse of delay period Δ1, and can be opened in process 69 (which may be before, after, or simultaneously with the opening of relay 44 in process 68).

A second delay period Δ2 is then counted down in process 70 to provide sufficient time for transient currents to settle following the opening of relays 43, 44. Shunt control circuit 48 then performs process 72 to turn off transistor 45, followed by opening relay 46. Again, because transistor 45 responds faster than relay 46, simultaneous control signals may be issued by shunt control circuit 48 to transistor 45 and the energizing coil of relay 46; alternatively, the control signal turning off transistor 45 may be issued prior to opening relay 46. In either case, relay 46 opens under zero current in process 72, since transistor 45 will have already been turned off.

As a result of this operation, inrush and protection circuitry 12 has then effectively managed a shutdown disconnect in the event of a fault, while preventing damaging arcing at the various relays 43, 44, 46. This prevention is carried out, in the event of a fault in rectifying stage 14, by shunt circuit 40 first diverting input current from main in-line relays 43, 44 at the time that relays 43, 44 are opened, and by transistor 45 turning off prior to the opening of its series shunt relay 46. In each case, relays are opened only under reduced or zero current, reducing the possibility of an arc at the contacts.

This construction of inrush and protection circuitry 12 also enables the use of smaller, less expensive, AC-rated relays for relays 43, 44, 46, even though power converter 5 may be receiving DC input power (including "hard" DC power). As known in the art, DC-rated relays are constructed to be capable of opening their contacts under large DC current levels that can cause arcing, while AC-rated relays may rely on the self-extinguishing effect of AC power, and thus can be more lightly constructed. The difference in form factor and device cost between AC-rated and DC-rated relays is significant, as known in the art. However, because the embodiments described in this specification divert the current from the inrush and protection circuit relays 43, 44, 46 by the time that the relays are opened, these relays may be AC-rated relays, reducing the cost, form factor, and complexity of power converter 5 in these embodiments.

Figure 7:
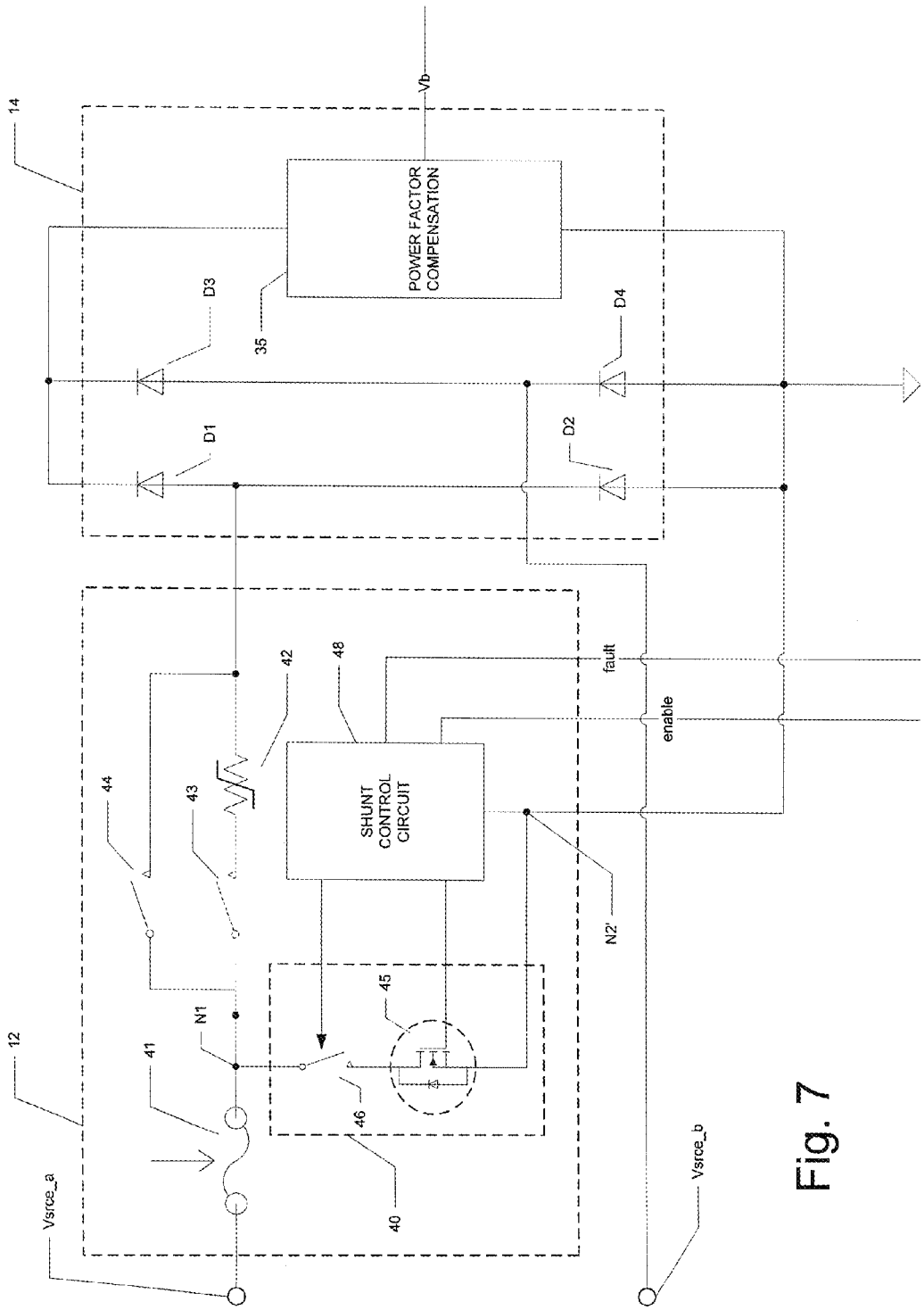
FIG. 7 is an electrical diagram, in schematic form, of inrush and protection circuitry in combination with a rectifying stage according to another embodiment.

Referring now to FIG. 7, the interconnection of inrush and protection circuit 12 and rectifying stage 14 according to another embodiment will now be described. Inrush and protection circuit 12 and rectifying stage 14 are each constructed similarly as described above relative to FIG. 4a. However, in this embodiment, the source of transistor 45 in shunt circuit 40 is not connected to terminal Vsrce_b as in FIG. 4a, but rather that source node and also the ground reference of shunt control circuit 48 are connected to node N2', which is at signal ground and at the anodes of diodes D2 and D4 of rectifying stage 14. This signal ground at node N2' also serves as the ground reference of power factor compensation 35. This interconnection allows shunt control circuit 48 to directly drive the gate of transistor 45 to signal ground. In contrast, in which the gate control signal issued by shunt control circuit 48 is a "floating" level according to the connections shown in FIG. 4a, because the input logic levels applied to shunt control circuit 48 (e.g., on control signal _fault_) are referenced to signal ground while the ground reference of shunt control circuit 48 itself and also the source of transistor 45 is at input Vsrce_b (at least one diode drop above ground). That connection shown in FIG. 4a would often require isolation within shunt control circuit 48 to drive the gate signal to transistor 45. In the arrangement of FIG. 7, however, that isolation is not required because the source of transistor 45 and the ground reference of shunt control circuit are at signal ground. The current conducted by shunt circuit 40, when closed, thus runs from input Vsrce_a and node N1 to node N2' at signal ground, and back to input Vsrce_b vial diode D4. Inrush and protection circuit 12 and rectifying stage 14 otherwise operate similarly to that described above relative to FIG. 4a.

Figure 8:
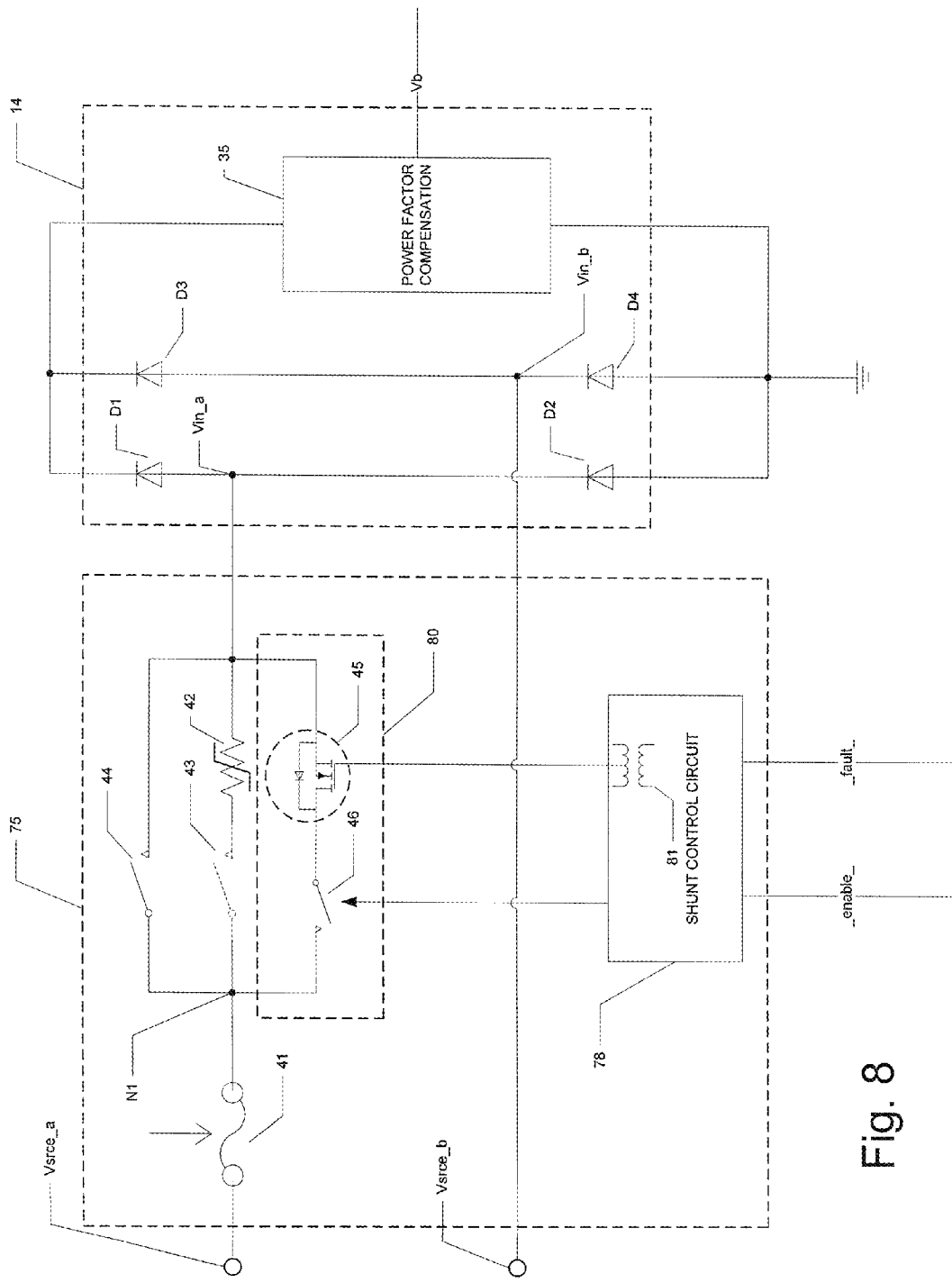
FIG. 8 is an electrical diagram, in schematic form, of inrush and protection circuitry in combination with a rectifying stage according to another embodiment.

Referring now to FIG. 8, the construction of inrush and protection circuit 75 according to another embodiment will now be described. Similar circuit elements of inrush and protection circuit 75 of FIG. 8 will be referred to by the same reference numerals as in inrush and protection circuit 12 of FIG. 4a, and may be similarly constructed as in the corresponding description above. In this arrangement, shunt circuit 80 is connected in parallel with current limiting device 42 (and, if present, its series relay 43) and with relay 44, between node N1 and input node Vin_a of rectifying stage 14. Shunt circuit 80 in this embodiment includes transistor 45 and optional relay 46, with the source/drain path of transistor 45 connected in series with the contact path of relay 46 between nodes N1 and Vin_a. Shunt control circuit 78 receives control signals _enable_ and _fault_ as before and in response generates the appropriate gate drive to transistor 45 and drive to the energizing coil of relay 46. In this embodiment, however, because the source node of transistor 45 is not at signal ground but will instead be at the voltage of node Vin_a, shunt control circuit 78 will include the appropriate isolation transformer 81 for driving the gate of transistor 45, as suggested by FIG. 8.

The operation of inrush and protection circuit 75 according to this embodiment can follow that described above in connection with FIG. 6. As described above, shunt circuit 80 will be disabled by shunt control circuit 78 if the input power source is an AC source such as AC grid 2 or a diesel generator (for which any relay arcing is "self-extinguishing"), or if the input power source is a "hard" DC source such as a battery backup system (for which fuse 41 will provide protection).

For renewable sources, though, shunt control circuit 78 will enable the operation of shunt circuit 80 according to the operational sequence described above relative to FIG. 6. In the event of a fault, such as a shorting failure of a capacitor in power factor compensation 35 or of one of diodes D1 through D4, relay 44 will be effectively placed across input terminals Vsrce_a, Vsrce_b, in series with fuse 41 and perhaps one or more diode drops. However, the closing of shunt circuit in process 66 will divert at least a portion of this source current from relay 44, enabling relay 44 to be opened in process 68 without substantial arcing (and enabling relay 43, if present, to be opened in process 69). As described above, transistor 45 is turned off by shunt control logic 78 first in process 72, which turns off the current through relay 46 and allowing it to be opened (also in process 72) under zero current, eliminating arcing in shunt circuit 80.

Figure 9:
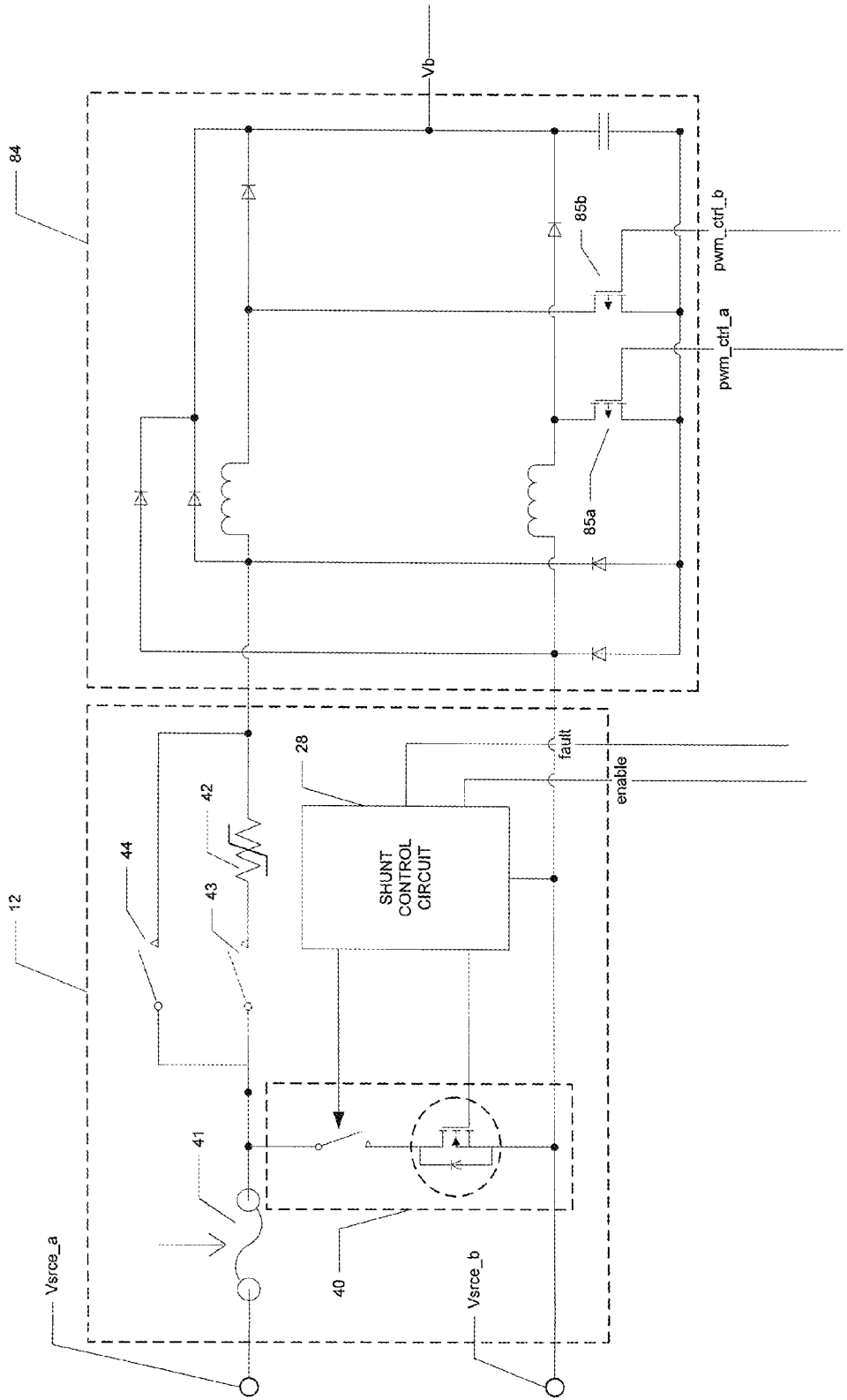
FIG. 9 is an electrical diagram, in schematic form, of inrush and protection circuitry in combination with a rectifying stage according to another embodiment.

FIG. 9 illustrates an alternative arrangement of a portion of power converter 5 according to another embodiment. Again, similar circuit elements will be referred to by the same reference numerals as in previously described embodiments, and may be similarly constructed as in the corresponding description above. In this embodiment, inrush and protection circuit 12 is constructed as described above in connection with FIG. 4a, although it may alternatively be constructed according to the other described embodiments and variations thereof. In the arrangement of FIG. 9, however, rectifying stage 84 is constructed in the form of a bridgeless rectifier with power factor compensation, according to conventional construction for such circuits. Transistors 85a, 85b in bridgeless rectifying stage 84 will each be gated at a duty cycle controlled by pulse width modulator 18 (FIG. 4) via control lines pwm_ctrl_a, pwm_ctrl_b, respectively.

As evident from FIG. 9, the disclosed embodiments of inrush and protection circuit and variations thereof may be used in combination with a wide variety of rectifying stages and power converter circuits, including of both the bridge and bridgeless type. It is therefore contemplated that these embodiments and variations thereof can have applicability and can provide benefit to a wide range of power converter implementations and applications.

Each of the disclosed embodiments are capable of providing important benefits and advantages. These embodiments enable the construction and operation of power converters that can be used with any one of a number of power source types, including the AC grid, diesel and other fossil-fueled AC generators, "hard" DC power sources such as battery backup systems, and renewable power sources such as solar cell arrays, wind-powered generators, geothermal generators, and water-powered generators, for effectively managing shutdown in the event of a power converter fault in each of those implementations. More specifically, the disclosed embodiments can be constructed and operate to effectively disconnect the input power source from the power converter circuitry in a manner that prevents damage due to arcing at its internal relays. The arrangement of these embodiments ensures that relays are opened only under low or effectively zero current, reducing the possibility of an arc at the contacts, and does so in a manner that allows the use of small, less expensive, AC-rated relays rather than larger and more expensive DC-rated relays. The cost, form factor, and complexity of power converter utilizing these embodiments can thus be reduced.

It is of course contemplated that modifications of, and alternatives to, these embodiments, such modifications and alternatives obtaining any or all of the advantages and benefits of these disclosed embodiments, will be apparent to those of ordinary skill in the art having reference to this specification and its drawings. It is therefore further contemplated that such modifications and alternatives are within the scope of the claims.

What is claimed is:

1. A power converter, comprising:
   a converter;
   a protection circuit comprising a first relay, the first relay having a contact path coupled between an input of the power converter via a first node and the converter;
   a shunt circuit connected to the first node, and comprising a transistor with a conduction path coupled to the first node; and
   shunt control circuitry having an output connected to a control terminal of the transistor, the shunt control circuitry is set up to turn on the transistor responsive to a fault condition at the converter, wherein the shunt circuit is configured to divert current from the contact path during the fault condition.

2. The power converter of claim 1, wherein the shunt circuit further comprises:
   an auxiliary relay having a contact path connected in series with the conduction path of the transistor, and controlled by the shunt control circuitry.

3. The power converter of claim 1, wherein the power converter has first and second input terminals adapted to receive power from a power source, the first input terminal coupled to the first node;
   wherein the shunt circuit is connected between the first node and a second node coupled to the second input terminal of the power converter; and
   wherein the converter has first and second converter input nodes coupled to the first and second input terminals, the first converter input node coupled to the first input terminal via the protection circuit and connected to the second input terminal via the second node.

4. The power converter of claim 3, further comprising:
   a fuse connected between the first input terminal and the first node; and
   wherein the power source comprises an alternating current (AC) grid.

5. The power converter of claim 3, wherein the converter and the shunt control circuit are both biased to a signal ground;
   wherein the converter comprises a rectifier;
   wherein the rectifier comprises a diode bridge coupled to the first and second converter input nodes; and
   wherein the transistor of the shunt circuit is a field-effect transistor having a gate connected to the output of the shunt control circuit, and a source/drain path coupled between the first node and signal ground.

6. The power converter of claim 1, wherein the shunt circuit further comprises:
   an auxiliary alternating current-rated (AC-rated) relay having a contact path connected in series with a source/drain path of the transistor, the auxiliary AC-rated relay controlled by the shunt control circuitry.

7. The power converter of claim 1, wherein the power converter has first and second input terminals adapted to receive power from a solar cell array power source, the first input terminal coupled to the first node;
wherein the converter has first and second converter input nodes coupled to the first and second input terminals, respectively, the first converter input node coupled to the first input terminal via the protection circuit; and
wherein the shunt circuit further comprises an auxiliary relay having a contact path connected in series with the conduction path of the transistor, and controlled by the output of the shunt control circuitry.

8. The power converter of claim 7, wherein the transistor of the shunt circuit is a field-effect transistor having a gate connected to the output of the shunt control circuit, and a source/drain path coupled between the first node and signal ground; and
wherein the shunt control circuitry comprises:
an isolating gate drive circuit, for inductively driving a gate signal applied to the gate of the transistor.

9. The power converter of claim 1, wherein the protection circuit further comprises:
a current limiting device connected in parallel with the contact path of the first relay.

10. The power converter of claim 9, wherein the protection circuit further comprises:
a second relay having a contact path connected in series with the current limiting device.

11. The power converter of claim 1, further comprising:
a DC-DC converter, coupled to outputs of the converter, and configured to generate DC power at an output of the power converter.

12. The power converter of claim 1, further comprising:
power type detection circuitry operable to detect a type of power received at the input of the power converter, the power type detection circuitry coupled to the shunt control circuit;
wherein the shunt control circuit is disabled by the power type detection circuitry detecting AC power at the input of the power converter; and
wherein the type of power is at least one of an AC power source, a low-impedance DC source, and a high-impedance DC source.

13. A power converter configured to receive a power source across a positive terminal and a negative terminal, comprising:
a protection circuit comprising a first relay, the first relay having a contact path coupled between the positive terminal via a first node and a converter;
a shunt circuit connected between the first node and the negative terminal, the shunt circuit comprising an auxiliary relay and a transistor coupled in series;
a shunt control circuit having an output connected to a control terminal of the transistor, the shunt control circuit operable to close the shunt circuit in response to a fault condition at the converter;
a power type detection circuit operable to detect at least one of an alternating current (AC) source, a high-impedance direct current (DC) source, and a low-impedance DC source in the power source across positive terminal and the negative terminal, the power type detection circuit coupled to the shunt control circuit;
wherein the shunt circuit is configured to divert current from the contact path during the fault condition; and
wherein the shunt control circuit is disabled when the power type detection circuit detects the low-impedance DC source, and is enabled when the power type detection circuit detects the high-impedance DC source.

14. A method of operating a protection circuit in a power converter, comprising:
applying power from a power source across a first input and a second input of a power converter;
closing contacts of a first relay in the power converter to communicate the applied power to a converter, the contacts of the first relay being in a contact path connected between the converter and a first node coupled to the first input of the power converter;
detecting a fault condition at the converter;
closing a shunt circuit connected to the first node to divert current from the contact path of the first relay in response to the fault condition; and
opening the contacts of the first relay after the shunt circuit is closed;
wherein the shunt circuit is configured to divert current from the contact path during the fault condition.

15. The method of claim 14, further comprising:
prior to closing contacts of the first relay, communicating the applied power to the converter via a current limiting device coupled between the first node and the converter.

16. The method of claim 15, wherein the communicating comprises:
closing contacts of a second relay connected in series with the current limiting device between the first node and the converter.

17. The method of claim 14, wherein closing the shunt circuit comprises:
generating a shunt control signal upon detecting the fault condition; and
receiving the shunt control signal at a gate of a transistor, causing a current path through the transistor to close.

18. The method of claim 17, wherein closing the shunt circuit further comprises:
closing contacts of an auxiliary relay upon receipt of the shunt control signal, wherein the contacts of the auxiliary relay close after closing the current path through the transistor, and wherein the contacts of the auxiliary relay create a current path in series with the current path through the transistor.

19. The method of claim 17, wherein the shunt circuit is connected between the first node and the second input of the power converter.

20. The method of claim 18 further comprising:
removing the shunt control signal at the gate of the transistor, causing the current path through the transistor to open after opening the contacts of the first relay; and
subsequently opening the contacts of the auxiliary relay.

* * * * *